United States Patent
Chennubhotla et al.

(10) Patent No.: US 12,272,071 B2
(45) Date of Patent: Apr. 8, 2025

(54) SCALABLE AND HIGH PRECISION CONTEXT-GUIDED SEGMENTATION OF HISTOLOGICAL STRUCTURES INCLUDING DUCTS/GLANDS AND LUMEN, CLUSTER OF DUCTS/GLANDS, AND INDIVIDUAL NUCLEI IN WHOLE SLIDE IMAGES OF TISSUE SAMPLES FROM SPATIAL MULTI-PARAMETER CELLULAR AND SUB-CELLULAR IMAGING PLATFORMS

(71) Applicant: University of Pittsburgh-Of the Commonwealth System of Higher Education, Pittsburgh, PA (US)

(72) Inventors: Srinivas C. Chennubhotla, Pittsburgh, PA (US); Om Choudhary, Pittsburgh, PA (US); Akif Burak Tosun, Pittsburgh, PA (US); Jeffrey Fine, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 400 days.

(21) Appl. No.: 17/909,891

(22) PCT Filed: Mar. 16, 2021

(86) PCT No.: PCT/US2021/022470
§ 371 (c)(1),
(2) Date: Sep. 7, 2022

(87) PCT Pub. No.: WO2021/188477
PCT Pub. Date: Sep. 23, 2021

(65) Prior Publication Data
US 2023/0096719 A1    Mar. 30, 2023

Related U.S. Application Data

(60) Provisional application No. 62/990,264, filed on Mar. 16, 2020.

(51) Int. Cl.
*G06T 7/00* (2017.01)
*G06T 7/12* (2017.01)
(Continued)

(52) U.S. Cl.
CPC ............ *G06T 7/143* (2017.01); *G06T 7/0012* (2013.01); *G06T 7/12* (2017.01); *G06T 7/149* (2017.01);
(Continued)

(58) Field of Classification Search
CPC . G06T 7/11; G06T 7/0012; G06T 7/12; G06T 7/0014; G06T 7/143; G06T 7/149;
(Continued)

(56) References Cited

U.S. PATENT DOCUMENTS

2014/0254900 A1    9/2014  Sturm
2015/0324660 A1   11/2015  Stein et al.
(Continued)

OTHER PUBLICATIONS

Achanta, Radhakrishna, et al. "SLIC superpixels compared to state-of-the-art superpixel methods." IEEE transactions on pattern analysis and machine intelligence 34.11 (2012): 2274-2282.
(Continued)

*Primary Examiner* — Kent Yip
(74) *Attorney, Agent, or Firm* — Philip E. Levy; Eckert Seamans Cherin & Mellott, LLC

(57) ABSTRACT

A method (and system) of segmenting one or more histological structures in a tissue image represented by multi-parameter cellular and sub-cellular imaging data includes receiving coarsest level image data for the tissue image, wherein the coarsest level image data corresponds to a coarsest level of a multiscale representation of first data corresponding to the multi-parameter cellular and sub-cellular imaging data. The method further includes breaking the coarsest level image data into a plurality of non-overlapping
(Continued)

superpixels, assigning each superpixel a probability of belonging to the one or more histological structures using a number of pre-trained machine learning algorithms to create a probability map, extracting an estimate of a boundary for the: one or more histological structures by applying a contour algorithm to the probability map, and using the estimate of the boundary to generate a refined boundary for the one or more histological structures.

23 Claims, 7 Drawing Sheets

(51) Int. Cl.
　　　*G06T 7/143*　　(2017.01)
　　　*G06T 7/149*　　(2017.01)
　　　*G06V 10/70*　　(2022.01)
　　　*G06V 20/69*　　(2022.01)
　　　*G06V 10/52*　　(2022.01)

(52) U.S. Cl.
　　　CPC ............ *G06V 10/70* (2022.01); *G06V 20/695* (2022.01); *G06T 2207/20016* (2013.01); *G06T 2207/20116* (2013.01); *G06T 2207/30024* (2013.01); *G06V 10/52* (2022.01)

(58) Field of Classification Search
　　　CPC . G06T 2207/20016; G06T 2207/20116; G06T 2207/30024; G06V 10/70
　　　USPC .......................... 382/128, 133, 134, 173, 199
　　　See application file for complete search history.

(56) References Cited

U.S. PATENT DOCUMENTS

| | | |
|---|---|---|
| 2017/0243345 A1 | 8/2017 | Abedini et al. |
| 2018/0204085 A1 | 7/2018 | Chennubhotla et al. |
| 2024/0037747 A1* | 2/2024 | Raedt .................. G06V 20/698 |

OTHER PUBLICATIONS

Chan, Tony F., and Luminita A. Vese. "Active contours without edges." IEEE Transactions on image processing 10.2 (2001): 266-277.

Burt, Peter, and Edward Adelson. "The Laplacian pyramid as a compact image code." IEEE Transactions on communications 31.4 (1983): 532-540.

Xing et al. "Robust Nucleus/Cell Detection and Segmentation in Digital Pathology and Microscopy Images: A Comprehensive Review", IEEE Rev Biomed Eng, Dec. 1, 2017. Retrieved on Dec. 5, 2021.

Parvatikar Akash et al: "Modeling Histological Patterns for Differential Diagnosis of Atypical Breast Lesions" In: "Medical Image Computing and Computer Assisted Intervention—MICCAI 2020 : 23rd International Conference, Lima, Peru, Oct. 4-8, 2020, Proceedings, Part V", Sep. 29, 2020 (Sep. 29, 2020), Springer International Publishing, Cham, XP093138305, ISSN: 0302-9743 ISBN: 978-3-030-59722-I vol. 12265, pp. 550-560, Retrieved from the Internet: URL:https://link.springer.com/content/pdf/ 10.1007/978-3-030-59722-1.pdf>.

Ehteshami Bejnordi Babak et al: "Automated Detection of DCIS in Whole-Slide H&E Stained Breast Histopathology Images", IEEE Transactions on Medical Imaging, IEEE, USA, vol. 35, No. 9, Sep. 2016 (Sep. 2016), pp. 2141-2150, XP011621364, ISSN: 0278-0062, DOI: 10.1109/TMI.2016.2550620.

Bejnordi Babak E et al: "A multi-scale superpixel classification approach to the detection of regions of interest in whole slide histopathology images", Progress in Biomedical Optics and Imaging, SPIE—International Society for Optical Engineering, Bellingham, WA, US, vol. 9420, Mar. 19, 2015 (Mar. 19, 2015), pp. 94200H-94200H, XP060051554, ISSN: 1605-7422, DOI: 10.1117/12.2081768 ISBN: 978-1-5106-0027-0 * the whole document *.

* cited by examiner

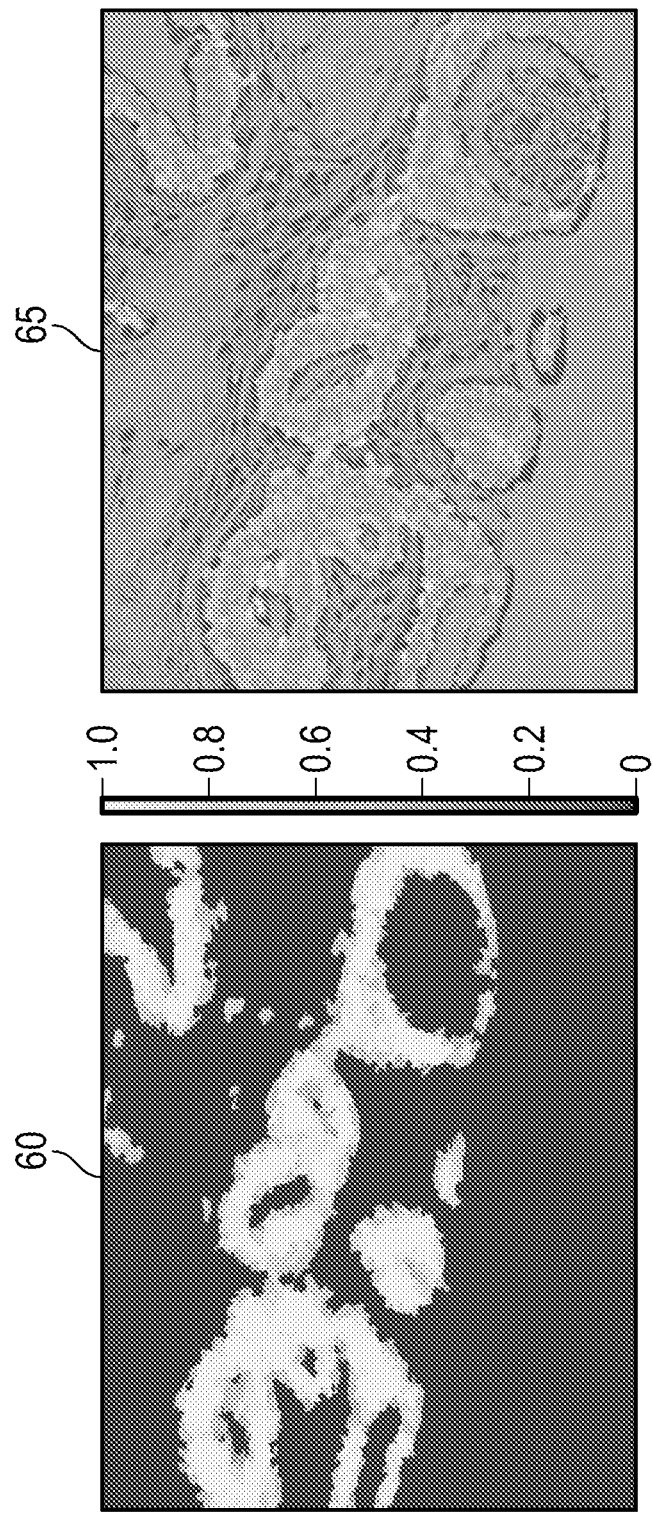

SCALABLE AND HIGH PRECISION CONTEXT-GUIDED SEGMENTATION OF HISTOLOGICAL STRUCTURES INCLUDING DUCTS/GLANDS AND LUMEN, CLUSTER OF DUCTS/GLANDS, AND INDIVIDUAL NUCLEI IN WHOLE SLIDE IMAGES OF TISSUE SAMPLES FROM SPATIAL MULTI-PARAMETER CELLULAR AND SUB-CELLULAR IMAGING PLATFORMS

CROSS-REFERENCE TO RELATED APPLICATIONS

This application is a U.S. National Stage Application under 35 U.S.C. § 371 of International Application No. PCT/US2021/022470, filed on Mar. 16, 2021, entitled, "SCALABLE AND HIGH PRECISION CONTEXT-GUIDED SEGMENTATION OF HISTOLOGICAL STRUCTURES INCLUDING DUCTS/GLANDS AND LUMEN, CLUSTER OF DUCTS/GLANDS, AND INDIVIDUAL NUCLEI IN WHOLE SLIDE IMAGES OF TISSUE SAMPLES FROM SPATIAL MULTI-PARAMETER CELLULAR AND SUB-CELLULAR IMAGING PLATFORMS", which claims priority under 35 U.S.C. § 119 (e) from U.S. Provisional Patent Application No. 62/990,264, filed on Mar. 16, 2020, entitled "SCALABLE AND HIGH PRECISION CONTEXT-GUIDED SEGMENTATION OF HISTOLOGICAL STRUCTURES INCLUDING DUCTS/ GLANDS AND LUMEN, CLUSTER OF DUCTS/ GLANDS, AND INDIVIDUAL NUCLEI IN WHOLE SLIDE IMAGES OF TISSUE SAMPLES FROM SPATIAL MULTI-PARAMETER CELLULAR AND SUB-CELLULAR IMAGING PLATFORMS", the contents of which are incorporated herein by reference.

GOVERNMENT CONTRACT

This invention was made with government support under grant # CA204826 awarded by the National Institutes of Health (NIH). The government has certain rights in the invention.

BACKGROUND OF THE INVENTION

1. Field of the Invention

The present invention relates to digital pathology, and in particular, to a system and method for scalable and high precision context-guided segmentation of histological structures, including, without limitation, ducts/glands and lumen, clusters of ducts/glands, and individual nuclei, in multi-parameter cellular and sub-cellular imaging data for a number of stained tissue images, such as whole slide images, obtained from a number of patients or a number of multi-cellular in vitro models.

2. DESCRIPTION OF THE RELATED ART

The histopathological examination of disease tissue is essential for disease diagnosis and grading. At present, pathologists make diagnostic decisions (such as malignancy and severity of disease) based on visual interpretation of histopathological structures, usually in the transmitted light images of disease tissues. Such decisions can be often subjective and result in a high level of discordance particularly in atypical situations.

In addition, digital pathology is gaining traction in applications such as second-opinion telepathology, immunostain interpretation, and intraoperative telepathology. Typically, in digital pathology, a large volume of patient data, consisting of and representing a number of tissue slides, is generated and evaluated by a pathologist by viewing the slides on a high-definition monitor. Because of the manual labor involved, the current workflow practices in digital pathology are time consuming, error-prone and subjective.

SUMMARY OF THE INVENTION

In one embodiment, a method of segmenting one or more histological structures in a tissue image represented by multi-parameter cellular and sub-cellular imaging data is provided. The method includes receiving coarsest level image data for the tissue image, wherein the coarsest level image data corresponds to a coarsest level of a multiscale representation of first data corresponding to the multi-parameter cellular and sub-cellular imaging data. The method further includes breaking the coarsest level image data into a plurality of non-overlapping superpixels, assigning each superpixel a probability of belonging to the one or more histological structures using a number of pre-trained machine learning algorithms to create a probability map, extracting an estimate of a boundary for the one or more histological structures by applying a contour algorithm to the probability map, and using the estimate of the boundary to generate a refined boundary for the one or more histological structures. In one exemplary implementation, the multiscale representation comprises a Gaussian multiscale pyramid decomposition, wherein the multi-parameter cellular and sub-cellular imaging data comprises stained tissue image data, wherein the receiving coarsest level image data for the tissue image comprises receiving coarsest level normalized constituent stain image data for the stained tissue image, wherein the coarsest level normalized constituent stain image data is for a particular constituent stain of the stained tissue image and corresponds to the coarsest level of the Gaussian multiscale pyramid decomposition of the first data corresponding to the stained tissue image data, and wherein the breaking the coarsest level image data into a plurality of superpixels comprises breaking the coarsest level normalized constituent stain image data into the plurality of superpixels.

In another embodiment, a computerized system for segmenting one or more histological structures in a tissue image represented by multi-parameter cellular and sub-cellular imaging data is provided. The system includes a processing apparatus, wherein the processing apparatus includes a number of components configured for implementing the method just described.

BRIEF DESCRIPTION OF THE DRAWINGS

FIG. 8 illustrates an exemplary probability map and an exemplary image showing the application of the region-based active contour algorithm according to an exemplary embodiment of the disclosed concept.

DETAILED DESCRIPTION OF EXEMPLARY EMBODIMENTS

Figure 1:
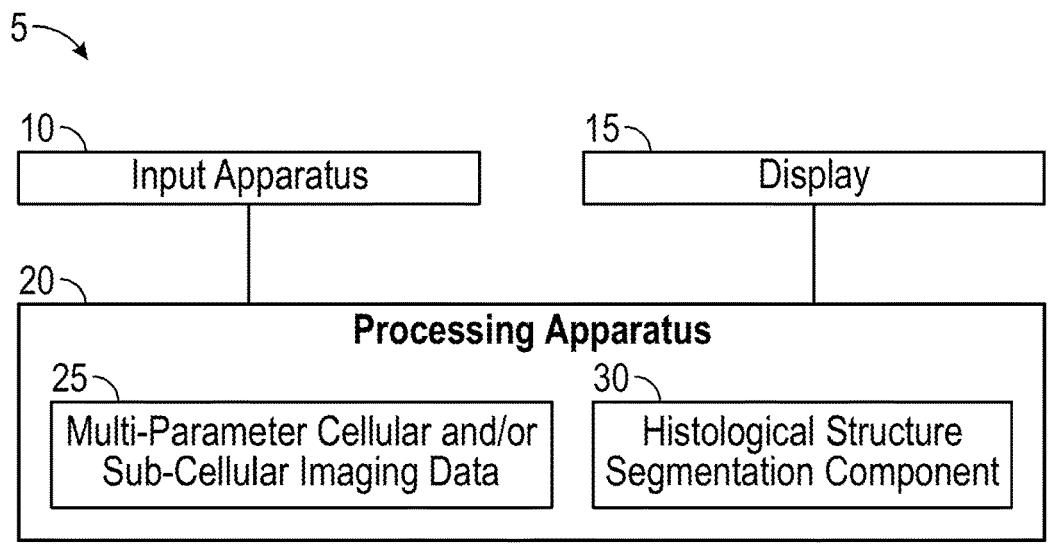
FIG. 1 is a schematic diagram of an exemplary digital pathology system for segmenting histological structures from multi-parameter cellular and sub-cellular imaging data according to an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. While certain ways of displaying information to users are shown and described herein with respect to certain figures or graphs as screenshots, those skilled in the relevant art will recognize that various other alternatives can be employed.

As used herein, the term "multi-parameter cellular and sub-cellular imaging data" shall mean data obtained from generating a number of images from a number of a sections of tissue which provides information about a plurality of measurable parameters at the cellular and/or sub-cellular level in the sections of tissue. Multi-parameter cellular and sub-cellular imaging data may be created by a number of different imaging modalities, such as, without limitation, any of the following: transmitted light (e.g., a combination of H&E and/or IHC (1 to multiple biomarkers)); fluorescence; immunofluorescence (including but not limited to antibodies, nanobodies); live cell biomarkers multiplexing and/or hyperplexing; and electron microscopy. Targets include, without limitation, tissue samples (human and animal) and in vitro models of tissues and organs (human and animal).

As used herein, the term "superpixel" shall mean a connected patch or group of two or more pixels with similar image statistics defined in a suitable color space (e.g., RGB, CIELAB or HSV).

As used herein, the term "non-overlapping superpixel" shall mean a superpixel whose boundary does not overlap with any of the superpixels in its neighborhood.

As used herein, the term "Gaussian multiscale pyramid decomposition" shall mean subjecting an image to repeated smoothing and subsampling the image by two in x and y directions with a Gaussian filter.

As used herein, the term "region-based active contour algorithm" shall mean any active contour model that takes image gradients into account to detect object boundaries.

As used herein, the term "context-ML model" shall mean a machine learning algorithm that can take into account neighborhood information of a superpixel.

As used herein, the term "stain-ML model" shall mean a machine learning algorithm that can take into account the stain intensities of a superpixel.

As used herein, the term "probability map" shall mean a set of pixels having probability values that range from 0 to 1 which probability values refer to the locational probability of whether the pixel is within a certain histological structure.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

The disclosed concept, described in further detail herein in connection with various exemplary embodiments, provides novel approaches to identify and characterize the morphological properties of histopathological structures. An early application of such a tool is to perform scalable and high precision context-guided segmentation of histological structures, including, for example and without limitation, ducts/glands and lumen, cluster of ducts/glands, and individual nuclei, in images (e.g., whole slide images) of tissue samples based on spatial multi-parameter cellular and sub-cellular imaging data representing such images. In this particular non-limiting application of the disclosed concept, as described in greater detail herein, hematoxylin and eosin (H&E) image data is employed as the multi-parameter cellular and sub-cellular imaging data, with color deconvolved hematoxylin image data being used to segment ducts/glands and lumen, cluster of ducts/glands, and individual nuclei. It will be understood, however, that this is meant to be exemplary only, and that the disclosed concept may be employed to segment other histological structures using other types of data. For example, connective tissue may be segmented by using color deconvolved eosin image data obtained from H&E image data. Still other possibilities are contemplated within the scope of the disclosed concept.

The disclosed concept relates to and improves upon subject matter that is described in U.S. application Ser. No. 15/577,838 (published as 2018/0204085), titled, "Systems and Methods for Finding Regions of Interest in Hematoxylin and Eosin (H&E) Stained Tissue Images and Quantifying Intratumor Cellular Spatial Heterogeneityiln Multiplexedi-Hyperplexed Fluorescence Tissue Images" and owned by the assignee hereof, the disclosure of which is incorporated herein by reference. The disclosed concept is different in at least two ways from the subject matter of the above-identified application. First, the disclosed concept falls in the category of semi-supervised or weakly supervised, in that there is user input for at least one step of a machine learning algorithm. Also, the disclosed concept works optimally if given a rough estimate for the region of interest (ROI), where the boundary for the ROI is approximate. The disclosed concept as described in detail herein sharpens such rough boundaries.

FIG. 1 is a schematic diagram of an exemplary digital pathology system 5 structured and configured for automatic segmentation of histological structures from multi-parameter cellular and sub-cellular imaging data according to an exemplary embodiment of the disclosed concept as described herein. As seen in FIG. 1, system 5 is a computing device structured and configured to generate and/or receive multi-parameter cellular and sub-cellular imaging data (labelled 25 in FIG. 1) and process that data as described herein to segment histological structures within the tissue images represented by the multi-parameter cellular and sub-cellular imaging data 25. System 5 may be, for example and without limitation, a PC, a laptop computer, a tablet computer, or any other suitable computing device structured and configured to perform the functionality described herein.

System 5 includes an input apparatus 10 (such as a keyboard), a display 15 (such as an LCD), and a processing apparatus 20. A user is able to provide input into processing apparatus 20 using input apparatus 10, and processing apparatus 20 provides output signals to display 15 to enable display 15 to display information to the user as described in detail herein (e.g., a segmented tissue image). Processing apparatus 20 comprises a processor and a memory. The processor may be, for example and without limitation, a microprocessor (µP), a microcontroller, an application specific integrated circuit (ASIC), or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory has stored therein a number of routines that are executable by the processor, including routines for implementing the disclosed concept as described herein. In particular, processing apparatus 20 includes a histological structure segmentation component 30 configured for identifying and segmenting histological structures (such as, without limitation, ducts/glands and lumen, clusters of ducts/glands, and individual nuclei) in a number of tissue images represented by the multi-parameter cellular and sub-cellular imaging data 25 obtained from various imaging modalities as described herein in the various embodiments (e.g., H&E stained image data).

Figure 2A:
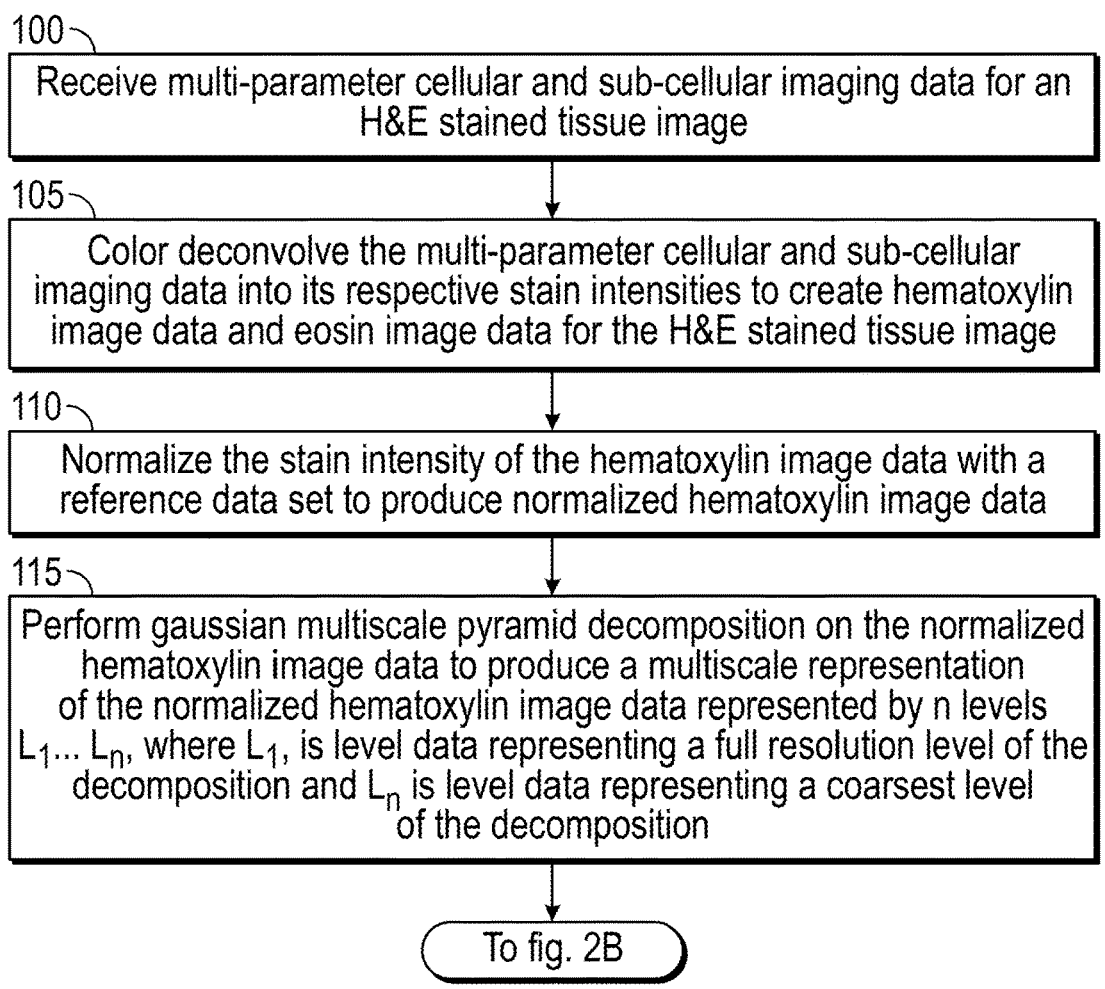
FIGS. 2A-2B are a flowchart illustrating a method of segmenting histological structures according to a particular exemplary embodiment of the disclosed concept.
Figure 2B:
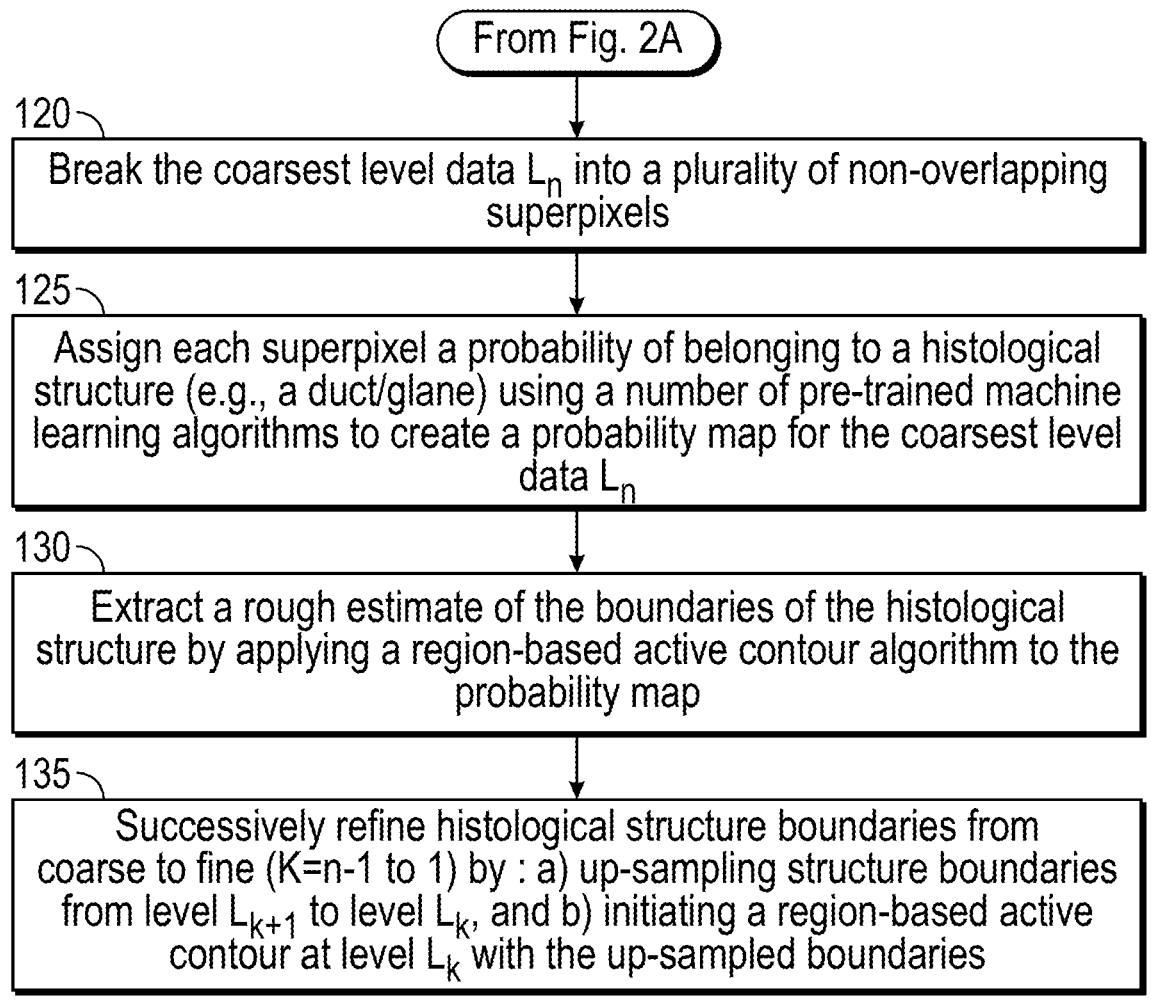

FIGS. 2A-2B are a flowchart illustrating a method of segmenting histological structures according to a particular exemplary embodiment of the disclosed concept. The method shown in FIGS. 2A-2B may, for example and without limitation, be implemented in system 5 of FIG. 1 described above, and for illustrative purposes the method is described as such. In addition, in the particular non-limiting exemplary embodiment shown in FIGS. 2A-2B, the multi-parameter cellular and sub-cellular imaging data that is used is H&E stained image data for a tissue sample, and the histological structures that are segmented are based on hematoxylin image data and include ducts/glands and lumen, clusters of ducts/glands, and individual nuclei. Again, it will be understood that the particular embodiment shown FIGS. 2A-2B and described herein is meant to be exemplary only and not limiting. It will be understood that other types of multi-parameter cellular and sub-cellular imaging data may be used in connection with the disclosed concept.

Figure 3:
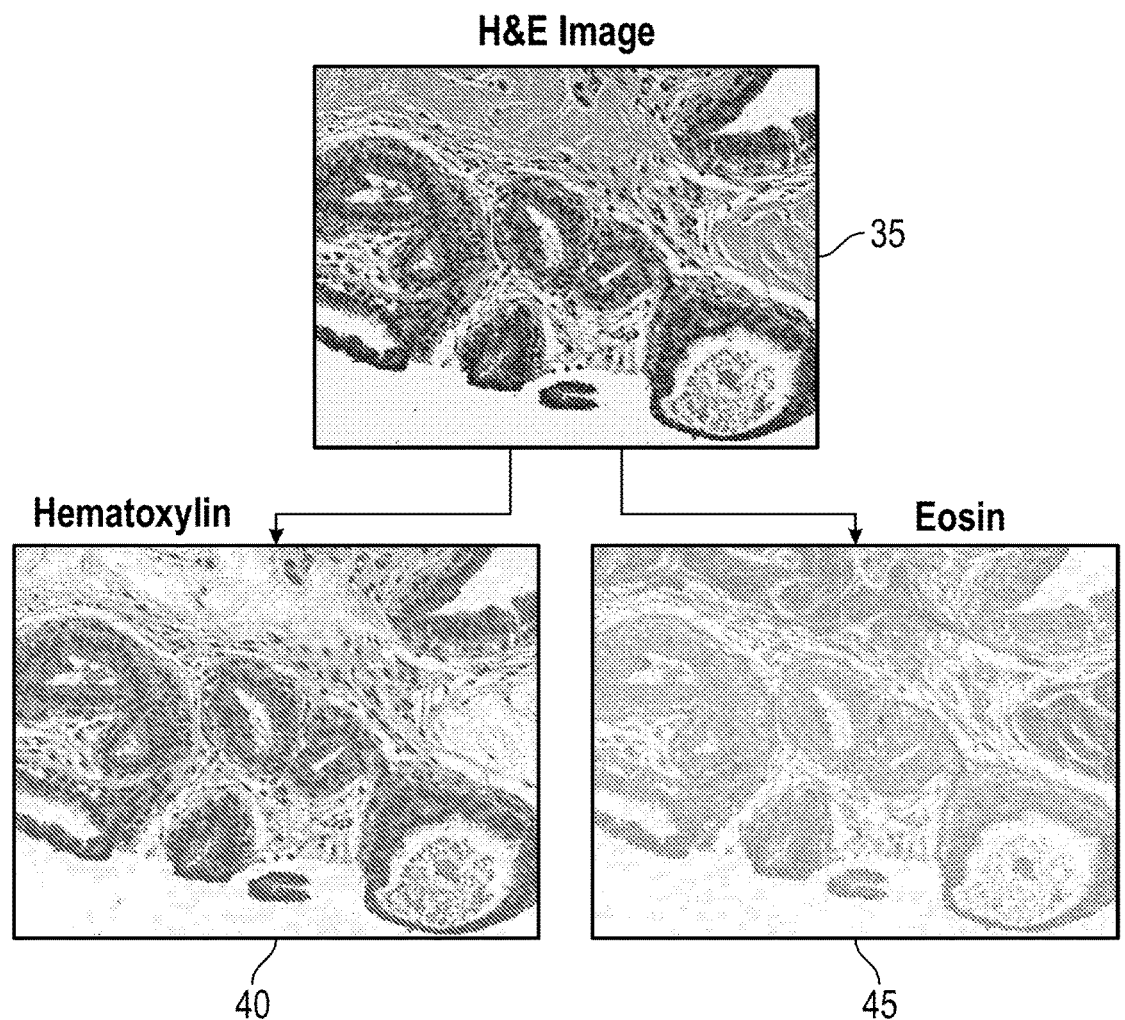
FIG. 3 shows a non-limiting exemplary HE stained tissue image that may be processed by the disclosed concept, and illustrates the color deconvolution step of an exemplary embodiment of the disclosed concept.

Referring to FIG. 2A, the method begins at step 100, wherein processing apparatus 20 of system 5 generates and/or receives multi-parameter cellular and sub-cellular imaging data representing an H&E stained tissue image to be processed. A non-limiting exemplary H&E stained tissue image 35 that may be processed by the disclosed concept is shown in FIG. 3 for illustrative purposes. In addition, in the exemplary embodiment, the multi-parameter cellular and sub-cellular imaging data that is generated and/or received in step 100 is in RGB format.

Next, at step 105, the multi-parameter cellular and sub-cellular imaging data that is generated and/or received in step 100 (i.e., the H&E stained tissue image data in RGB format) is color deconvolved into its respective stain intensities (hematoxylin and eosin) to create hematoxylin image data and eosin image data for the H&E stained tissue image to be processed. FIG. 3 illustrates the color deconvolution of step 105 by showing hematoxylin image 40 represented by hematoxylin image data and the resulting eosin image 45 represented by eosin image data that results from the color deconvolution of H&E stained tissue image 35.

Figure 4:
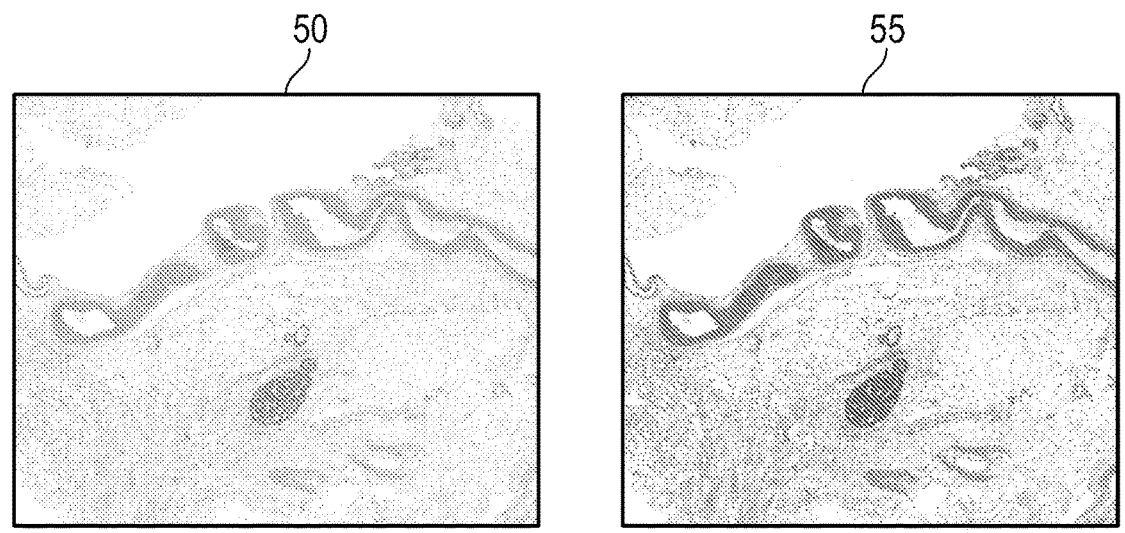
FIG. 4 illustrates the stain intensity normalization of step of an exemplary embodiment of the disclosed concept.

The method then proceeds to step 110, wherein the stain intensity of the hematoxylin image data is normalized with a reference data set to produce normalized hematoxylin image data. The stain intensity normalization of step 110 is performed so that stain intensity variations are standardized for downstream processing. In the exemplary embodiment, to set up a reference dataset, a batch of whole slide images (WSIs) are first color deconvolved into hematoxylin and eosin stained intensity images. From this batch, a random number of 1K×1K images are cropped and used to build a cumulative intensity histogram for the hematoxylin channel. A test WSI undergoes the color deconvolution operation first. Then, histogram equalization is performed to match the intensity histogram of the hematoxylin channel with the histogram of the reference dataset. The stain intensity normalization of step 110 is illustrated in FIG. 4, which shows the original hematoxylin channel 50 of another (different) exemplary whole slide image, and the normalized hematoxylin channel 55 of the same exemplary whole slide image. As a result, the intensity of the normalized hematoxylin channel 55 now matches those of the reference image data set.

Figure 5:
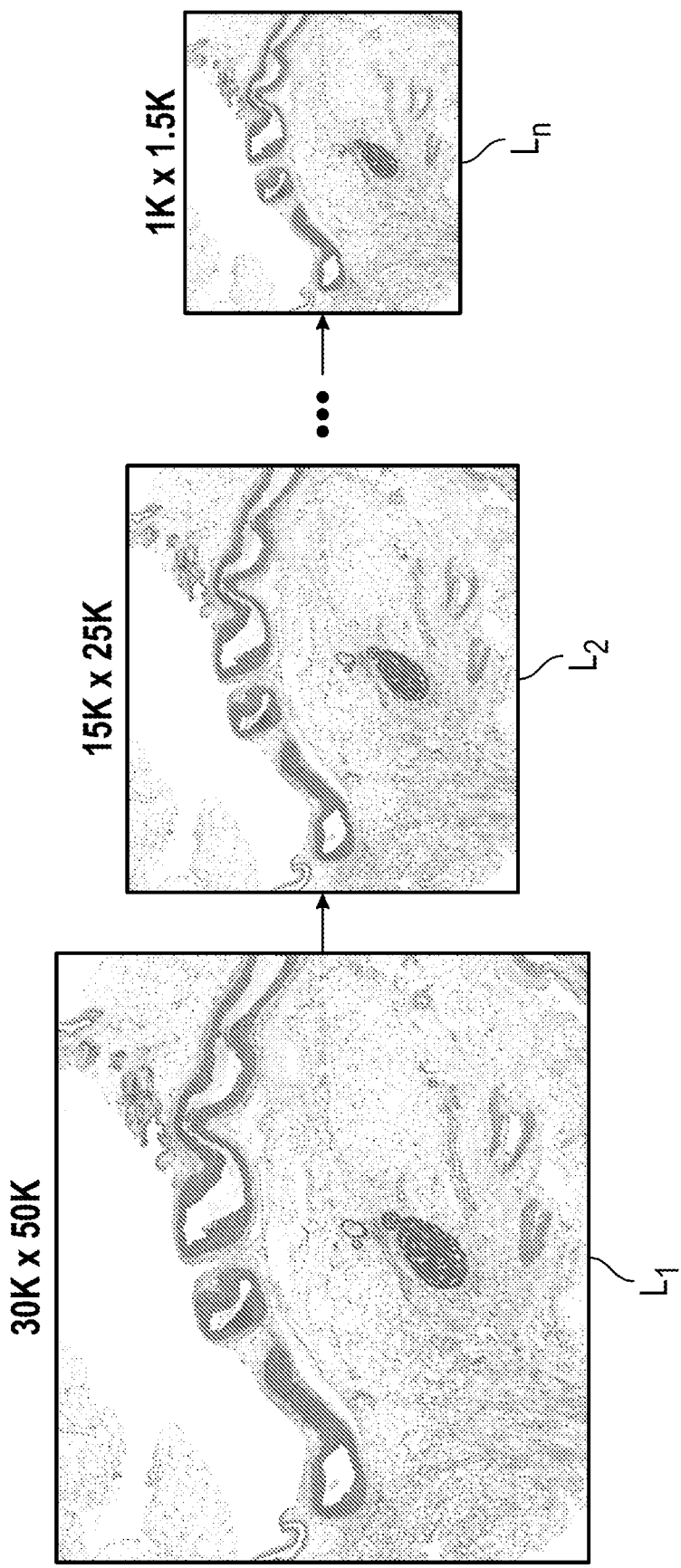
FIG. 5 illustrates the Gaussian multiscale pyramid decomposition step of an exemplary embodiment of the disclosed concept.

Next, at step 115, a Gaussian multiscale pyramid decomposition (a form of a pyramid representation) is performed on the normalized hematoxylin image data to produce a multiscale representation of the normalized hematoxylin image data. The multiscale representation that is created at step 115 includes n levels, $L_1 \ldots L_n$, where $L_1$ is level data representing the full resolution level of the decomposition and $L_n$ is level data representing the coarsest level of the decomposition. The building of the Gaussian pyramid eases the computational burden of detecting histological structures in whole slide images according to the method of the disclosed concept. FIG. 5 illustrates the Gaussian multiscale pyramid decomposition of the exemplary normalized hematoxylin channel 55 shown in FIG. 4. In the exemplary embodiment, the size of the image is reduced from 30K×50K at the original resolution to 1K×1.5K at the coarsest level. In addition, in the exemplary embodiment, at every level of the decomposition hierarchy, the size of the image is halved.

Figure 6:
FIG. 6 illustrates the breaking of image data into superpixels according to an exemplary embodiment of the disclosed concept.

The method then proceeds to step 120 of FIG. 2B. At step 120, the coarsest level data $L_n$ is broken into non-overlapping superpixels, which, in the exemplary embodiment, are sets of connected pixels with similar intensity (gray) values. As will be appreciated, this may be done in a number of ways. In the simplest approach, a Normal distribution for noise is assumed, with zero mean and sigma standard deviation. For example, for an image with 256 gray levels per pixel, typically the standard deviation of noise is assumed to be four gray levels. This value may be set by the end-user. In the exemplary embodiment, this is done using a simple linear iterative clustering (SLIC) algorithm, a number of which are known in the art. FIG. 6 shows the result of step 120 when performed on the coarsest level data $L_n$ obtained from exemplary hematoxylin image 40 as described herein. In the exemplary embodiment, the image is segmented into approximately 5K superpixels, which is recommended for 1K×1K hematoxylin channel images because of their fast computation and effectiveness in downstream processing. In addition, in the exemplary embodiment, 2-D Delaunay triangulation of the superpixel centroids is performed to identify spatial neighbors for each superpixel.

In addition, according to an aspect of the disclosed concept, a number of machine learning algorithms/models are trained to predict superpixels that belong to a particular histological structure, which in the exemplary embodiment is a duct/gland. Thus, following step 120, the method proceeds to step 125, wherein each superpixel is assigned a probability of belonging to a histological structure, such as a duct/gland in the illustrated exemplary embodiment, using the number of pre-trained machine learning algorithms. This results in the creation of a probability map for the coarsest level data $L_n$.

In the non-limiting exemplary embodiment of the disclosed concept, the number of trained machine learning algorithms that are employed at step 125 comprises a context-ML model (such as a context-support vector machine (SVM) model or a context-logistic regression (LR) model) and a stain-ML model (such as a stain-support vector machine (SVM) model or a stain-logistic regression (LR) model) to predict superpixels that belong to the structure in question. In this exemplary embodiment, RGB color histograms of superpixels and their neighbors are used as feature vectors. Specifically, in this embodiment, two models are built and trained (in a supervised manner), namely the context-ML model and the stain-ML model, each of which is described in greater detail below.

Figure 7:
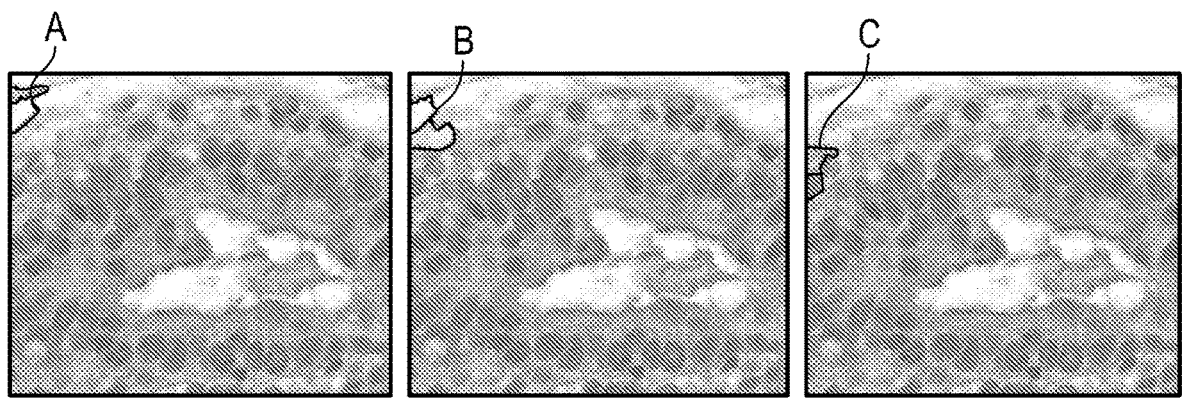
FIG. 7 illustrates exemplary superpixel pairs according to an exemplary embodiment of the disclosed concept.
Figure 7:
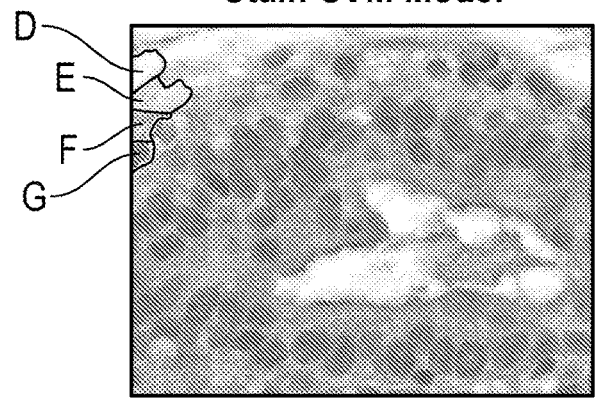

With respect to the context-ML model, which in the exemplary embodiment is a context-SVM model, for the training set of the exemplary embodiment, 2000 neighboring superpixel pairs in 10 different images from the reference image dataset are randomly selected. Ground-truth is collected by displaying superpixel pairs on the screen and asking subjects (e.g., experienced/expert pathologists) if none, one, or both of the displayed superpixels belong to a duct (i.e., user input is solicited). For illustration purposes, FIG. 7 shows three such exemplary superpixel pairs, labelled A, B, and C, from an exemplary image that have none (class label 0), one (class label 1), and two (class label 2) superpixels in a duct, respectively. This ground truth is used as class-labels for training the context ML model. In the exemplary embodiment, as a feature vector, color histograms (i.e., pixel values in R, G and B colors) for each superpixel pair and their first neighbors are used. For each test superpixel pair, the ML model returns a probability of this pair having none, one or both superpixels belonging to a duct. In each case, the superpixel pair is assigned to the category with the highest probability. Note, this does not determine the actual identity of the superpixel that is inside the structure. Instead, a second model, the stain-ML described below, is applied to for that purpose.

With respect to the stain-ML model, which in the exemplary embodiment is a stain-SVM model, the ground-truth is collected differently. In particular, subjects (e.g., experienced/expert pathologists) are asked to categorize whether a given superpixel has "no stain", "light stain", "moderate stain", "heavy stain" or "unsure" (i.e., again, user input is solicited). Because certain structures, such as ducts, are amorphous shaped, one way to detect the structure boundary is to closely observe the change in stain colors moving from inside of a duct to the surrounding connective tissue. This information can be used to identify superpixels that are potentially part of a duct. FIG. 7 shows four such superpixels, D, E, F, and G, for an exemplary image that are categorized as having "no stain", "light stain", "moderate stain" and "heavy stain", respectively. Superpixels are assigned to the category with the highest probability.

Thus, in step 125 according to this particular exemplary embodiment, the above two machine learning models (the context-ML model and the stain-ML model) are applied sequentially to the non-overlapping superpixels of the coarsest level data $L_n$ (step 120) to create the probability map for identifying superpixel pairs that are likely to be inside the structure in question (a duct in this exemplary embodiment). In the exemplary embodiment, all those superpixels that are moderate-to-heavily stained are identified as the ones inside the duct. In other words, the context-ML model and the stain-ML model together assign a conditional probability to each superpixel of belonging to the structure in question.

Once the probability map is created in step 125 as described above, the method proceeds to step 130. At step 130, a rough estimate of the boundaries of the histological structure are extracted by applying a region-based active contour algorithm to the probability map. An exemplary probability map 60 and an exemplary image 65 showing the application of the region-based active contour algorithm are provided in FIG. 8.

Then, the method proceeds to step 135, wherein the rough estimate just obtained is used to provide segmentation of the structure(s) in a full resolution image. Specifically, step 135 involves successively refining the histological structure boundaries starting from coarse to fine by up sampling structure boundaries from level K+1 to level K and initiating a region-based active contour at level K with the up sampled boundaries. In the exemplary embodiment, up sampling involves first locating the coordinates of the boundary in level K from level K+1 by simply multiplying by a factor of 2 the coordinates found at K+1 and then interpolating between the boundary pixels at level K.

Thus, in the exemplary method shown in FIGS. 2A and 2B, the superpixels are only utilized in the coarsest level of the pyramid. As described, the region-based contour is run on a probability map over the identified superpixels. However, at successive finer scales, no superpixels are needed, and the region-based active contours run directly on the relevant stain separated image.

In one particular implementation of this exemplary embodiment, the region-based active contour algorithm that is employed is a Chan-Vese segmentation algorithm that separates foreground (ducts) from the background (rest of the image). The cost-function for the active contour is driven by the difference in the mean of the hematoxylin stain in the foreground and background regions. For example, two superpixels that have a high probability of being inside a duct have roughly the same stain (moderate to heavy stain) and their boundaries are merged iteratively by the active contour optimization.

To construct a "cluster" of ducts, the region-based active contour may be run on the probability map returned by the context-ML model and the stain-ML models. In the exemplary embodiment, the probability maps impute non-zero probabilities to regions bridging ducts and a region-based active contour model run on the probability map is more successful in delineating a cluster of ducts. To segment ducts from the entire WSI, ducts and cluster of ducts are first identified on the lowest resolution pyramidal image using the steps described above. These results are recursively up sampled, where at each level of the hierarchy the region-based active contour is rerun to refine the up sampled duct boundaries. In the exemplary embodiment, the active contour image consists of a mask denoting pixels inside and outside the duct boundary. The active contour image and the hematoxylin image are up sampled together.

The disclosed concept may also be used to identify nuclei inside the ducts. Once the ducts are identified, the superpixel segmentation is run in regions belonging to the ducts. The stain-ML model could then be run to further separate moderately stained and heavy stained superpixels inside the ducts. The heavily stained superpixels would correspond to the position of the nuclei inside the duct. To identify nuclei outside the ducts, a similar model could be deployed that constructs feature vectors (the histograms of the red, blue and green channels) of superpixels without their first-layer neighbors. In absence of the mean histograms of superpixels and its first-layer, every heavy stained superpixels that corresponds to nuclei both inside and outside the ducts would be identified.

In the exemplary embodiment described in connection with FIGS. 2A and 2B, the color deconvolution and stain intensity normalization steps (105 and 110, respectively) are performed before the Gaussian multiscale pyramid decomposition is performed (step 115). In an alternative embodiment, the order of those steps is reversed. In particular, in an alternative embodiment of the disclosed concept, after the multi-parameter cellular and sub-cellular imaging data is received (step 100), a Gaussian multiscale pyramid decomposition is first performed on the entire H&E stained tissue image. Then, the color deconvolution and stain intensity normalization of steps 105 and 110, respectively, are performed on the just the coarsest level image data so as to produce normalized hematoxylin image data for just the coarsest level image. Thereafter, steps 120 through 130 are performed using the normalized hematoxylin image data for just the coarsest level image to generate the probability map and the rough estimate of the boundaries of the histological structure as described. Thereafter, the boundaries are successively refined using step 135 as described.

Again, it should be noted that while the particular embodiment(s) of the disclosed concept use color deconvolved hematoxylin image data to segment ducts/glands and lumen, cluster of ducts/glands, and individual nuclei, it will be understood that this is meant to be exemplary only, and that the disclosed concept may be employed to segment other histological structures using other types of data. For example, and without limitation, connective tissue may be segmented by using color deconvolved eosin image data (as opposed to color deconvolved hematoxylin image data) obtained from H&E image data. Still other possibilities are contemplated within the scope of the disclosed concept.

Furthermore, the foregoing description of the disclosed concept is based on and utilizes in situ multi-parameter cellular and sub-cellular imaging data. It will be understood, however, that that is not meant to be limiting. Rather, it will be understood that the disclosed concept may also be used in conjunction with in-vitro micro physiological models for basic research and clinical translation. Multicellular in vitro models permit the study of spatio-temporal cellular heterogeneity and heterocellular communication that recapitulates human tissue that can be applied to investigate the mechanisms of disease progression in vitro, to test drugs and to characterize the structural organization and content of these models for potential use in transplantation.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of segmenting one or more histological structures in a tissue image represented by multi-parameter cellular and sub-cellular imaging data, the method comprising:
    receiving coarsest level image data for the tissue image, wherein the coarsest level image data corresponds to a coarsest level of a multiscale representation of first data corresponding to the multi-parameter cellular and sub-cellular imaging data;
    breaking the coarsest level image data into a plurality of non-overlapping superpixels;
    assigning each superpixel a probability of belonging to the one or more histological structures using a number of pre-trained machine learning algorithms to create a probability map;
    extracting an estimate of a boundary for the one or more histological structures by applying a contour algorithm to the probability map; and
    using the estimate of the boundary to generate a refined boundary for the one or more histological structures.

2. The method according to claim 1, wherein the multiscale representation comprises a Gaussian multiscale pyramid decomposition, wherein the multi-parameter cellular and sub-cellular imaging data comprises stained tissue image data, wherein the receiving coarsest level image data for the tissue image comprises receiving coarsest level normalized constituent stain image data for the stained tissue image, wherein the coarsest level normalized constituent stain image data is for a particular constituent stain of the stained tissue image and corresponds to the coarsest level of the Gaussian multiscale pyramid decomposition of the first data corresponding to the stained tissue image data, and wherein the breaking the coarsest level image data into a plurality of superpixels comprises breaking the coarsest level normalized constituent stain image data into the plurality of superpixels.

3. The method according to claim 2, wherein the multi-parameter cellular and sub-cellular imaging data comprises stained tissue image data, wherein the receiving coarsest level image data for the tissue image comprises receiving coarsest level normalized constituent stain image data for the stained tissue image, wherein the coarsest level normalized constituent stained tissue image data is generated by: (i) color deconvolving the stained tissue image data into respective stain intensities to create constituent stain image data, (ii) normalizing the constituent stain image data using a reference data set to create normalized data, and (iii) performing the Gaussian multiscale decomposition on the normalized data to produce a multiscale representation of the normalized data including the coarsest level normalized constituent stain image data, and wherein the first data corresponding to the stained tissue image data is the normalized data.

4. The method according to claim 2, wherein the first data corresponding to the stained tissue image data is the stained tissue image data, wherein the coarsest level normalized constituent stain image data is generated by: (i) performing the Gaussian multiscale decomposition on the stained tissue image data to produce a multiscale representation of the stained tissue image data, (ii) color deconvolving the coarsest level of the Gaussian multiscale pyramid decomposition of the stained tissue image data into respective stain intensities to create coarsest level constituent stain image data, and (iii) normalizing the coarsest level constituent stain image data using a reference data set to create the coarsest level normalized constituent stain image data.

5. The method according to claim 2, wherein the number of pre-trained machine learning algorithms are a number of supervised machine learning algorithms pre-trained based on user input.

6. The method according to claim 5, wherein the number of pre-trained machine learning algorithms includes a context-SVM model or a context LR model and a stain-SVM model or a stain-LR model which are applied to the plurality of super pixels.

7. The method according to claim 2, wherein the contour algorithm is a region-based active contour algorithm.

8. The method according to claim 2, wherein the using the estimate of the boundary to generate a refined boundary for the one or more histological structures comprises up sampling boundaries of the one or more histological structures using levels of the Gaussian multiscale pyramid decomposition other than the coarsest level and utilizing a region-based active contour algorithm at a finest level of the Gaussian multiscale pyramid decomposition to create the refined boundary.

9. The method according to claim 2, wherein the structure comprises a duct or gland, wherein the stained tissue image data comprises H&E data, and wherein the particular constituent stain is hematoxylin.

10. The method according to claim 2, wherein the structure comprises connective tissue, wherein the stained tissue image data comprises H&E data, and wherein the particular constituent stain is eosin.

11. The method according to claim 1, wherein the breaking the coarsest level image data into a plurality of non-overlapping superpixels employs a linear iterative clustering (SLIC) algorithm.

12. A non-transitory computer readable medium storing one or more programs, including instructions, which when executed by a computer, causes the computer to perform the method of claim 1.

13. A computerized system for segmenting one or more histological structures in a tissue image represented by multi-parameter cellular and sub-cellular imaging data, comprising:
 a processing apparatus, wherein the processing apparatus includes a number of components configured for:
  receiving coarsest level image data for the tissue image, wherein the coarsest level image data corresponds to a coarsest level of a multiscale representation of first data corresponding to the multi-parameter cellular and sub-cellular imaging data;
  breaking the coarsest level image data into a plurality of non-overlapping superpixels;
  assigning each superpixel a probability of belonging to the one or more histological structures using a number of pre-trained machine learning algorithms to create a probability map;
  extracting an estimate of a boundary for the one or more histological structures by applying a contour algorithm to the probability map; and
  using the estimate of the boundary to generate a refined boundary for the one or more histological structures.

14. The system according to claim 13, wherein the multiscale representation comprises a Gaussian multiscale pyramid decomposition, wherein the multi-parameter cellular and sub-cellular imaging data comprises stained tissue image data, wherein the receiving coarsest level image data for the tissue image comprises receiving coarsest level normalized constituent stain image data for the stained tissue image, wherein the coarsest level normalized constituent stain image data is for a particular constituent stain of the stained tissue image and corresponds to the coarsest level of the Gaussian multiscale pyramid decomposition of the first data corresponding to the stained tissue image data, and wherein the breaking the coarsest level image data into a plurality of superpixels comprises breaking the coarsest level normalized constituent stain image data into the plurality of superpixels.

15. The system according to claim 14, wherein the multi-parameter cellular and sub-cellular imaging data comprises stained tissue image data, wherein the receiving coarsest level image data for the tissue image comprises receiving coarsest level normalized constituent stain image data for the stained tissue image, wherein the coarsest level normalized constituent stained tissue image data is generated by: (i) color deconvolving the stained tissue image data into respective stain intensities to create constituent stain image data, (ii) normalizing the constituent stain image data using a reference data set to create normalized data, and (iii) performing the Gaussian multiscale decomposition on the normalized data to produce a multiscale representation of the normalized data including the coarsest level normalized constituent stain image data, and wherein the first data corresponding to the stained tissue image data is the normalized data.

16. The system according to claim 14, wherein the first data corresponding to the stained tissue image data is the stained tissue image data, wherein the coarsest level normalized constituent stain image data is generated by: (i)

performing the Gaussian multiscale decomposition on the stained tissue image data to produce a multiscale representation of the stained tissue image data, (ii) color deconvolving the coarsest level of the Gaussian multiscale pyramid decomposition of the stained tissue image data into respective stain intensities to create coarsest level constituent stain image data, and (iii) normalizing the coarsest level constituent stain image data using a reference data set to create the coarsest level normalized constituent stain image data.

17. The system according to claim 14, wherein the number of pre-trained machine learning algorithms are a number of supervised machine learning algorithms pre-trained based on user input.

18. The system according to claim 17, wherein the number of pre-trained machine learning algorithms includes a context-SVM model or a context-LR model and a stain-SVM model or a stain-LR model which are applied to the plurality of super pixels.

19. The system according to claim 14, wherein the contour algorithm is a region-based active contour algorithm.

20. The system according to claim 14, wherein the using the estimate of the boundary to generate a refined boundary for the one or more histological structures comprises up sampling boundaries of the one or more histological structures using levels of the Gaussian multiscale pyramid decomposition other than the coarsest level and utilizing a region-based active contour algorithm at a finest level of the Gaussian multiscale pyramid decomposition to create the refined boundary.

21. The system according to claim 14, wherein the structure comprises a duct or gland, wherein the stained tissue image data comprises H&E data, and wherein the particular constituent stain is hematoxylin.

22. The system according to claim 14, wherein the structure comprises connective tissue, wherein the stained tissue image data comprises H&E data, and wherein the particular constituent stain is eosin.

23. The system according to claim 13, wherein the breaking the coarsest level image data into a plurality of non-overlapping superpixels employs a linear iterative clustering (SLIC) algorithm.

* * * * *